United States Patent

Bergmeyer et al.

[11] 3,872,082
[45] Mar. 18, 1975

[54] SUBSTITUTED PURINERIBOFURANOSIDE-3,5-CYCLOPHOSPHATE COMPOUNDS AND PROCESS FOR THEIR PREPARATION

[75] Inventors: Hans Ulrich Bergmeyer; Michael Nelboeck-Hochstetter; Gerhard Michal, all of Tutzing/Upper Bavaria; Klaus Mühlegger, Starnberg; Günter Weimann, Percha/Upper Bavaria; Egon Roesch, Lampertheim, all of Germany

[73] Assignee: Boehringer Mannheim G.m.b.H., Mannheim-Waldorf, Germany

[22] Filed: May 11, 1972

[21] Appl. No.: 252,393

[30] Foreign Application Priority Data
May 19, 1971 Germany.......................... 2125077

[52] U.S. Cl. .......................... 260/211.5 R, 424/180
[51] Int. Cl. ..................... C07d 51/52, C07d 51/54
[58] Field of Search ........................ 260/211.5 R

[56] References Cited
UNITED STATES PATENTS

| | | |
|---|---|---|
| 3,180,859 | 4/1965 | Hoeksema et al. .......... 260/211.5 R |
| 3,212,954 | 10/1965 | Kuhn et al. .................. 260/211.5 R |
| 3,337,528 | 8/1967 | Saito et al. .................. 260/211.5 R |
| 3,450,693 | 6/1969 | Suzuki et al. ................ 260/211.5 R |
| 3,454,559 | 7/1969 | Yamazaki et al. ........... 260/211.5 R |
| 3,712,885 | 1/1973 | Weimann et al. ............ 260/211.5 R |
| 3,751,408 | 8/1973 | Bergmeyer et al. .......... 260/211.5 R |

*Primary Examiner*—Johnnie R. Brown
*Attorney, Agent, or Firm*—Burgess, Dinklage & Sprung

[57] ABSTRACT

Novel substituted cyclophosphate compounds of the formula:

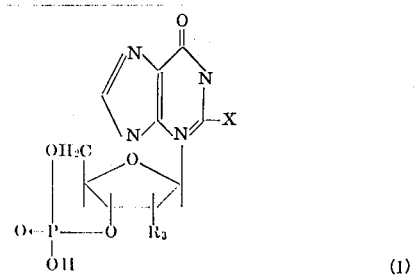

wherein X is halogen, hydrocarbyl, sulfhydryl, thioether, alkylsulfoxy, alkylsulfonyl or hydrocarbyl-substituted amino wherein said hydrocarbyl and alkyl radicals contain up to about 12 carbon atoms, and $R_3$ is hydrogen or hydroxyl;
are prepared by reacting the corresponding amine compound (wherein X in the formula is $NH_2$) with a nitrite and haloboric acid at a temperature below 0°C. to yield a compound wherein X in the formula is halogen, and converting the halogen compound, if desired, to one in which X has the other definitions set forth above, in conventional manner. Alternatively, the novel compounds are prepared from open-ring diamine compounds by reacting with an alkali metal xanthogenate or an orthoformate.

24 Claims, No Drawings

SUBSTITUTED PURINERIBOFURANOSIDE-3,5-CYCLOPHOSPHATE COMPOUNDS AND PROCESS FOR THEIR PREPARATION

The present invention is concerned with new purine-ribofuranoside-3',5'-cyclophosphates compounds with the preparation thereof.

The new cyclophosphate compounds according to the present invention are of the general formula:

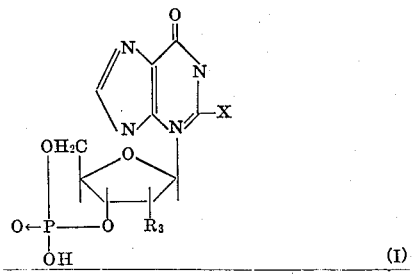

wherein X is halogen, hydrocarbyl, sulfhydryl, thioether, alkylsulfoxy, alkoxysulfonyl (of from, e.g., 1 to 6 carbon atoms in the alkyl or alkoxy moiety) or hydrocarbyl-substituted amino; and $R_3$ is hydrogen or hydroxyl; and the physiologically compatible salts thereof.

When X is a hydrocarbyl radical, it can be, for example, an alkyl, of, e.g., 1 to 10 carbon atoms, aryl or aralkyl radical, e.g., containing from 6 to 10 aryl carbon atoms and 1 to 6 alkyl carbons, and when X is a hydrocarbyl-substituted amino group, it can be represented by the general formula

wherein $R_1$ and $R_2$, which may be the same or different, are cycloalkyl (e.g. of from 3 to 8, preferably 5 or 6, ring carbon atoms) or alkyl, aralkyl or aryl radicals having the carbon atoms contents of X, above; and wherein $R_2$ can also be hydrogen; $R_1$ and $R_2$, together with the nitrogen atom to which they are attached, can also form a heterocyclic ring.

Especially preferred are those compounds of general formula (I) in which X:

1. is an amino group for the general formula

wherein $R_1$ and $R_2$, which can be the same or different, are alkyl or cycloalkyl radicals containing up to 6 carbon atoms, an aralkyl radical containing up to 4 carbon atoms in the alkyl group thereof or an aryl, especially phenyl radical, and wherein $R_2$ can also be a hydrogen atom or wherein $R_1$ and $R_2$, together with the nitrogen atom to which they are attached, for a 6-membered ring;

2. a chlorine or fluorine atom;

3. a sulfhydryl or alkylthio radical containing up to 6 carbon atoms;

4. an alkyl radical containing up to 6 carbon atoms; or 5. a methylsulfonyl or methylsulfoxy radical.

The new compounds according to the present invention can be prepared from appropriate compounds with a preformed cyclophosphate ring. Thus, the new compounds (I) according to the present invention can be prepared from compounds of general formula (I), wherein a compound of general formula (I) but in which X represents an amino group, is reacted with a nitrite and a haloboric acid, preferably fluoboric, at a temperature below 0°C. to give a compound of general formula (I), in which X is a halogen atom, which, if desired, is converted in known manner into a compound of general formula (I), in which X is a hydrocarbon, sulfhydryl, thioether, alkylsulfoxy, alkylsulfonyl or hydrocarbon-substituted amino radical.

The process according to the present invention, starting from a preformed cyclophosphate, is surprising because it was not to have been expected that the reaction could be carried out in the presence of the preformed cyclophosphate ring. In comparison with the well-known method or preparing cyclophosphates, starting from modified nucleosides and converting these via nucleotides into cyclophosphates, the process according to the present invention not only saves several synthesis steps but also enables compounds to be prepared which contain modified nucleotides which could not survive the known cyclisation process or, at most, could only be obtained in very low yields.

The starting materials for the process of the present invention is 2-amino-6-hydroxypurine-ribofuranoside-3', 5'-cyclophosphate (guanosine-3',5'-cyclophosphate), which is preferably converted at 0° to −40°C., via the corresponding diazonium haloborate, into a 2-halo-6-hydroxy-purine-3',5'-cyclophosphate, which is then reacted, for example, with an amine, alcoholate, mercaptan or the like to give a corresponding $C_2$-purine cyclophosphate derivative. The following equation illustrates the process on the basis of the preferred use of diazonium fluoroborate:

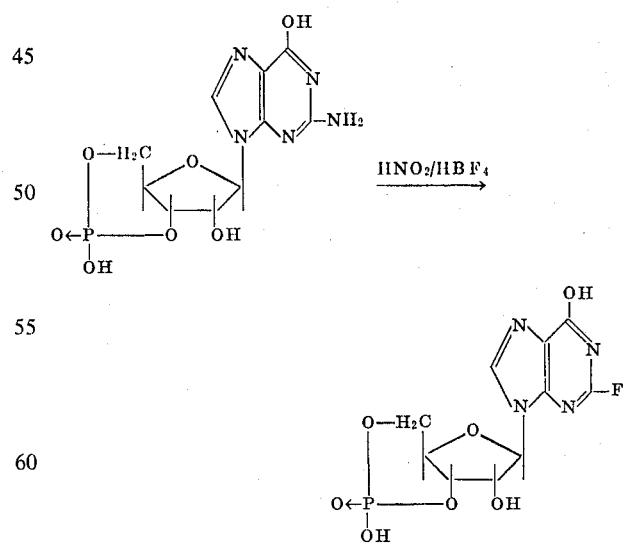

This reaction is already known for the non-phosphorylated base substances guanine and guanosine but the possibility of applying the reaction to compounds with a preformed cyclophosphate ring system was surprising for the above-mentioned reasons.

According to the present invention, compounds of formula (I) can also be prepared from a compound of the general formula:

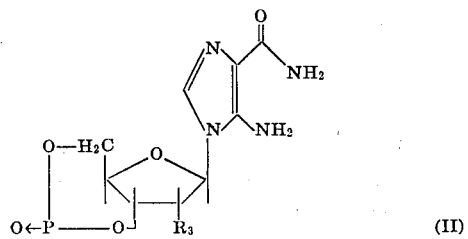

(II)

either by reaction with an alkali metal xanthogenate in a polar organic solvent with the formation of a compound of general formula (I), in which X is a sulfhydryl group and the latter is, if desired, alkylated or oxidised to an alkylsulfonyl or alkylsulfoxy radical and the latter, if desired, converted in known manner into a substituted amino group; or by reaction with an alkyl, aryl or aralkyl orthoformate, with the formation of a compound of general formula (I), in which X is an alkyl, aryl or aralkyl radical.

Compounds of the general formula (II) have already been described in German published specification No. 20 26 040.6.

As polar organic solvent, there is preferably used a lower alcohol, for example methanol or ethanol. The alkylation of the 2-mercapto compound can be carried out with a conventional alkylation agent and preferably with an alkyl iodide. The alkylthio derivative so obtained can be oxidized to give the corresponding alkylsulfonyl or alkylsulfoxy derivative, the oxidation is preferably carried out with chlorine gas. The conversion into the alkylsulphoxy derivative is preferably carried out with bromine in aqueous alkali metal hydroxide solution or with alkali metal periodate in aqueous solution. The following equations illustrate these processes method:

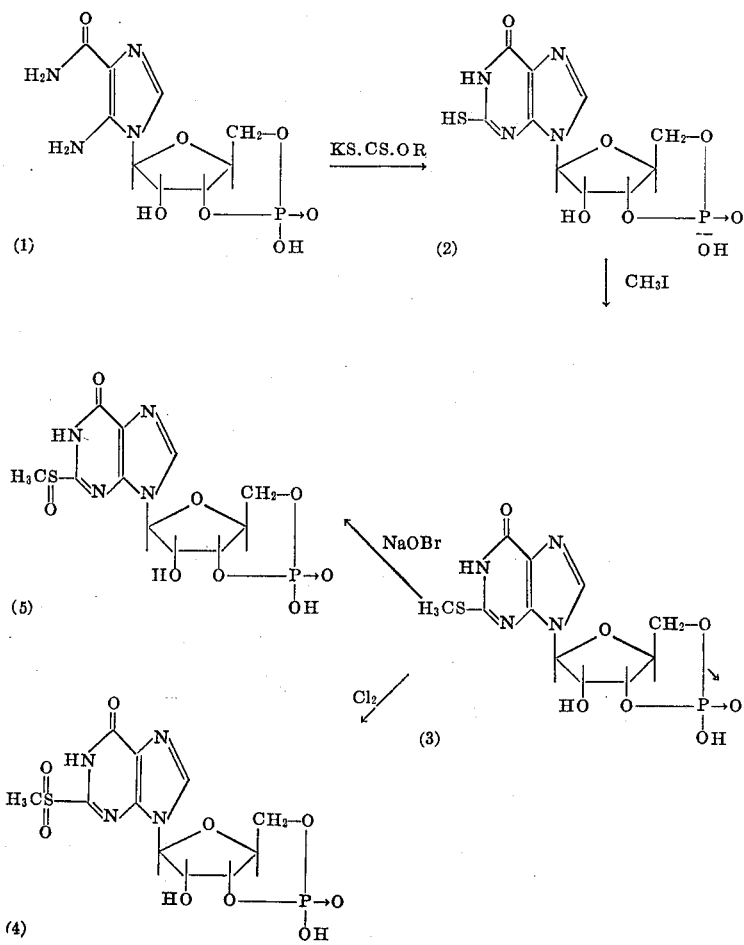

The reaction with an alkali metal xanthogenate, as well as the reaction with an orthoformic acid ester, primarily brings about a ting closure. Ring closure reactions of this kind are already known in the case of 5-amino-4-carboxamido-1-ribofuranosyl-imidazole (cf. Japanese Patent Specifications Nos. 26696/65 and 21230/64). However, in the case of the known process, the functional 2'- and 3'-hydroxyl groups must be protected with isopropylene radicals. According to the process of the present invention, not only is this masking of the hydroxyl groups unnecessary but, in addition, due to use of a cyclophosphate, functional groups are present in the molecule which did not permit the expectation of the course of the reaction in the desired direction. It is known that a phosphate residue in a molecule either blocks numerous chemical reactions which can take place in its absence or directs such reactions in a different way. For example, bromination processes which are usually successful in the case of nucleobases and nucleosides, cannot be carried out with nucleotides. Furthermore, the known sulfurization of nucleosides, for example, that of inosine with phosphorus pentasulfide and pyridine, cannot be applied to nucleotides.

Furthermore, due to the transannelated 3',5'-cyclophosphate ring, the steric configuration of the ribose is altered in comparison with the conditions in the nucleoside, the result of which is that the physicochemical parameters are decisively influenced. In addition, the cyclophosphate molecule contains a dissociable functional group which often reacts preferentially and, in particular, quite considerably alters the solubility in comparison with the protected nucleoside.

When the process according to the present invention starts from guanosine-3',5'-cyclophosphate, it is preferably carried out at a temperature between −20° and −30°C. When starting from a compound of general formula (II), this is preferably used in the form of a tetraalkyl-ammonium salt and the reaction is carried out in a lower aliphatic alcohol, methanol or a mixture of methanol with another lower alcohol, such as ethanol or isopropanol, being especially preferred.

The reaction is carried out at elevated temperature, preferably at a temperature above 100°C. and under increased pressure. The reaction is especially preferably carried out in an autoclave at a temperature of 140° to 150°C.

As alkali metal xanthogenate, it is preferred to use potassium ethyl xanthogenate or sodium ethyl xanthogenate. Amongst the tetraalkyl-ammonium salts, those containing 2 to 6 carbon atoms per alkyl radical are especially preferred.

Under the especially preferred conditions, the reaction in an autoclave takes about 2 to about 10 hours, optimum reaction normally being achieved after 5 hours.

The product obtained by the reaction with the alkali metal xanthogenate is decomposed by careful acid hydrolysis. From the hydrolysate, the 2-mercapto derivative of general formula (I) can be obtained in any desired manner. The mercapto compound can be purified by conventional methods, for example by chromatography on anion exchangers. Exchangers containing the diethylaminoethanol radical (DEAE) as functional group have proved to be especially useful. When using such exchangers, a triethyl-ammonium bicarbonate solution has proved to be especially useful as the elution agent.

The 2-mercapto compound of general formula (I) is very sensitive to acid-alkali oxidative and strongly reducing agents.

The 2-mercapto compound can easily be converted into the corresponding alkylthio compound by conventional alkylation agents, an alkyl iodide, for example, methyl iodide, being preferably used.

The 2-halo, preferably 2-fluoro and 2-chloro compounds, of general formula (I), which are preferably obtained according to the above-described process, starting from a compound of general formula (I) in which X is an amino group, are the preferred key products for the preparation of the corresponding compounds in which X is a hydrocarbon-substituted amino group. These compounds can also be obtained from thet mercapto anad methylthio compounds but with less good yields. On the other hand, nucleophile substitution starting from the alkylsulfonyl or alkylsulfoxy compounds of general formula (I), preferably from the corresponding methyl compounds, gives especially good yields. By boiling for several hours with primary or secondary amines, optionally in a solvent, for example, in a lower alcohol, dimethyl sulfoxide or the like, the desired products are obtained in good yield. The reaction can be carried out at temperatures between about 50° and about 150°C. Preferably and most simply, the reaction takes place at the boiling temperature of the amine used or of the solubiliser. The reaction times up to the complete disappearance of the compounds used of general formula (I), in which I is a halogen atom, depend upon the strength of the nucleophilic character of the substituents to be introduced and are generally between about 1 hour and about 20 hours.

The new compounds prepared by the process according to the present invention can be purified in known manner, chromatography on anion exchangers, for example of the Dowex 1×2 type, having proved to be useful. The use of the anion exchanger in the formate form is preferred. By preelution with dilute formic acid, foreign impurities can be removed and the main product can then be eluted with highly concentrated formic acid. The formic acid eluates so obtained can be evaporated directly. Some of the compounds according to the invention crystallise out directly upon evaporation, while others can be precipitated out with organic solvents, such as acetone.

The new compounds according to the present invention have been characterized by elementary analysis, ultra-violet spectrum, NMR spectrum, paper-chromatographic behaviour and paper-electrophoretic behaviour. Insofar as the corresponding nucleosides are already known, the product was decomposed enzymatically with specific phosphodiesterase and phosphatase and the properties of the resultant nucleosides compared with those of the described compounds. All compounds proved to be stable against acid and alkaline phosphatase.

The new compounds according to the present invention are valuable intermediates for the preparation of purine-ribofuranoside cyclophosphate derivatives with poly-substituted bases. Furthermore, the compounds according to the present invention possess interesting pharmacodynamic properties. Thus, the resistance of the new compounds to fission by phosphodiesterase is considerably greater than that of guanosine-3',5'-cyclophosphate so that a substantially prolonged period of action is achieved. Furthermore, the compounds according to the present invention show, in comparison with the mentioned guanosine base compounds, a superior ability to penetrate through cell walls.

In general, the compounds according to the present invention possess action which are comparable with but different from the actions of adenosine-3',5'-cyclophosphate and guanosine-3',5'-cyclophosphate. Thus, they influence the carbohydrate metabolism. In general, however, the increase of the blood sugar levels is less marked than in the case of the physiological base compounds. The other metabolic effects are also smaller than those of the base compounds. Thus, they influence the steroidogenesis which, however, is often only slightly marked. The influence on the heart and circulation is generally considerably smaller than in the case of the physiological base compounds. However, an outstanding inhibitory action on the smooth musculature, especially a spasmolytic effectiveness, is especially interesting. This spasmolytic effectiveness occurs especially markedly in the bronchi (trachea effect).

In addition, the compounds according to the present invention influence the calcium level. Furthermore, they can act as preformed nucleotides and, therefore, exhibit, for example, an antimetabolite action in the case of immunosuppression, as well as in the case of tumors.

Accordingly, the present invention also provides new pharmaceutical compositions comprising at least one of the new compounds according to the present invention, in admixture with a solid or liquid pharmaceutical diluent or carrier.

The following Examples are given for the purpose of illustrating the present invention. In the Examples, the following abbreviations are used:

G-3',5'-MP = guanosine-3',5'-cyclophosphate
X-3',5'-MP = xanthosine-3',5'-cyclophosphate
AICAR-3',5'-MP = 5-amino-4-carboxamido-1-ribofuranosyl-imidazole-3',5'-cyclophosphate
DMSO = dimethyl sulfoxide
DMF = dimethylformamide

EXAMPLE 1

Preparation of 2-fluoro-6-hydroxypurine-ribofuranoside-3',5'-cyclophosphate 15 ml. fluoboric acid (35% solution) were placed in a 50 ml. flask, cooled to −20°C. and 735 mg. (2mMol) sodium G-3',5'-MP were introduced, with vigorous stirring. 280 mg. sodium nitrite (4mMol), dissolved in 1 ml. water, were then added dropwise at −20°C. in the course of 45 minutes, the reaction solution thereby became yellow-green in color and foaming moderately. When the addition was completed, the reaction mixture was maintained at −20°C. for a further 30 minutes and subsequently carefully adjusted with concentrated aqueous ammonia solution to pH 4.5, the temperature being kept below −10°C. The paper chromatogram with 1 molar ammonium acetate/ethanol (5:2) showed, at this stage, three spots with the $R_F$ values: G-3',5'-MP = 1, 2-fluoro-6-hydroxypurine-3',5'-cyclophosphate = 1.11 and X-3, 5 -MP = 0.61. The solution was subsequently desalinated over charcoal (50 ml.) and eluted with ethanol/water/ammonium hydroxide. As a rule, this crude product was converted into a methanol-soluble salt by the addition of 1.3 ml. tetrabutyl ammonium hydroxide (2mMol), whereafter, by the addition of a primary or secondary amine, the substitution reaction was carried out directly.

In one batch, the 2-fluoro-6-hydroxypurine-cyclophosphate was purified and isolated by preparative silica gel thick layer chromatography and repeated development with n-butanol/glacial acetic acid/water (50/15/25). Removal of colloidally dissolved silica gel on charcoal and conversion into the sodium salt by passage over Dowex 50-Na gave a chromatographically uniform product (yield 240 mg. = 35% of theory).

EXAMPLE 2

Preparation of 2-benzylamino-6-hydroxypurine-ribofuranoside-3',5'-cyclophosphate An aqueous solution of 2-fluoro-6-hydroxypurine-ribofuranoside cyclophosphate tetrabutyl ammonium salt (obtained according to Example 1) was evaporated to an oil and dehydrated once with methanol. After dessolving in 30 ml. methanol and adding 2.5 ml. benzylamine (20mMol), it was heated under reflux for 3 to 4 hours. It was then evaporated, taken up in water and shaken out twice with 20 ml. ether. The aqueous phase was applied to an anion exchanger column of Dowex 1×2 formate (10 cm. long × 1 cm. diameter) and first washed with 1.25M formic acid and subsequently with 3M formic acid to elute the 2-benzylamino-6-hydroxypurine-riboside-3',5'-cyclophosphate formed. After concentration of the eluate to a few ml., the free acid of the benzylamino compound crystallized out. After washing twice with ethanol/water (1:1) and drying over phosphorus pentoxide in a vacuum, the yield was 120 mg. (14% of theory, referred to the G-3',5'-MP used).

In an analogous manner, with the use of 2-phenylbutylamine and cyclohexylamine, there were obtained the corresponding 2-(2''-phenylbutylamino) 2-cyclohexylamino compounds, respectively.

EXAMPLE 3

Preparation of 2-mercapto-6-hydroxypurine-ribofuranoside-3',5'-cyclophosphate

A reaction mixture was prepared containing 8.5 g. AICAR-3',5'-MP, free acid (26.5mMol, I); 17.2 ml. tetrabutyl ammonium hydroxide (40% in water; 26.2mMol; II); 42 g. potassium ethyl xanthogenate (263mMol) and 200 ml. methanol, p.a. II was added to a suspension of I in 100 ml. methanol, followed by vigorous shaking to bring the nucleotide into solution (if complete solution does not occur, a few further ml. of the base are added thereto). The methanol was distilled off to give a viscous residue which was subsequently freed from water with dry methanol. The residue was taken up in 200 ml. methanol and potassium ethyl xanthogenate added in the above-given amount. After vigorous shaking, the reaction mixture was placed into a 300 ml. laboratory autoclave.

After heating for 5 hours in an oil bath at 140° to 150°C., the autoclave was alloved to cool and the supernatant in the bomb poured off from the sediment deposited on the vessel walls and evaporated. The sediment from the autoclave was rinsed out with water into the oily, dark brown residue and extracted twice with chloroform. The chloroform extracts were discarded. The aqueous phase was acidified to pH 3 with acidic ion exchanger Dowex 50 H⁺ (pH meter, development of hydrogen sulfide), immediately filtered with suction from the exchanger, which was well washed and the filtrate immediately adjusted to pH 7 with 1N aqueous sodium hydroxide solution. The solution was concentrated to about 20 to 30 ml. and the product precipitated by stirring into acetone. Yield 12 g. crude 2-mercapto-6-hydroxypurine-ribofuranoside-3',5'-cyclophosphate, For the preparation of the pure 2-mercapto compound, the crude product was purified on an ion exchanger, for example on DEAE-cellulose: 1.5 g. crude 2-mercapto-6-hydroxypurine-ribofuranoside-3',5'-cyclophosphate sodium salt, obtained from 3mMol AI-CAR-3',5'-MP, were dissolved in 30 ml. water and applied to a DEAE-cellulose carbonate column (40 × 3.5 cm.). After washing, the column was eluted with a linear gradient (1.5 liters water/1.5 liters 0.3N triethylammonium bicarbonate). A sharp peak appeared, the fractions of which were collected and evaporated in a vacuum. Distilling off the concentrate twice with methanol and freeze drying of the aqueous solution yields 550 mg. of product (48% of theory, referred to the material used) in chromatographically pure form. The compound obtained was very sensitive; in particular, decomposition started quickly in an acidic medium in the presence of active charcoal; in the case of chromatography using isopropanol/ammonia/water, partial fission of the product occured.

EXAMPLE 4

Preparation of
2-methylthio-6-hydroxypurine-ribofuranoside-3',5'-cyclophosphate

In a 500 ml. round-bottomed flask, 25 g. crude 2 mercapto-6-hydroxyypurine-ribofuranoside-3',5'-cyclophosphate sodium salt (about 75%, corresponding to about 50 mMol) were dissolved in 200 ml. 0.2N sodium hydroxide solution, mixed with 9.4 ml. methyl iodide (150 mMol) and vigorously shaken for 2 to 3 hours. Paper chromatography (system 1M ammonium acetate/ethanol = 20:50) showed that the reaction was quantitative; due to the crude product used, some impurities were still to be seen. Excess methyl iodide was stripped off in a vacuum and the remaining solution adjusted with 1N hydrochloric acid to pH 4.5 and applied to a charcoal column (65 × 4 cm.). After washing, the column was eluted with ethanol/water/ammonia. The eluate was concentrated and then applied to an anion exchanger column of Dowex 1×2 in chloride form (column dimensions 50 × 50 × 3 cm.), washed and eluted with a linear gradient of 3 liters water/1M lithium chloride. The fractions were tested for purity by means of thin layer chromatography (system: silica gel; development with isopropanol/ammonium hydroxide/water = 7:1:2), combined, evaporated and again passed over a charcoal column (70 × 3 cm.). The eluate was subsequently concentrated to 30 ml. and precipitated in 50 ml. acetone. After drying in a vacuum over phosphorus pentoxide, a beige-colored product of 92% purity was obtained. Yield 11.1 g. (57% of theory) 2-methylthio-6-hydroxypurine-ribofuranoside-3',5'-cyclophosphate.

A sample of the compound, crystallized in the form of the free acid, gave the following data:
molecular weight: $C_{11}H_{13}N_4O_7PS \cdot H_2O = 394.2$
C calc. 33.5%; found 32.9%
H calc. 3.8%; found 3.8%
N calc. 14.2%; found 13.8%
P calc. 7.9%; found 7.9%

In analogous manner, with the use of hexyl iodide instead of methyl iodide, there was obtained the corresponding 2-hexylthio compound.

EXAMPLE 5

Preparation of
2-methylsulfonyl-6-hydroxypurine-ribofuranoside-3',5'-cyclophosphate 10 g. 2-methylthio-6-hydroxypurine-ribofuranoside-3',5'-cyclophosphate ammonium salt were suspended in 180 ml. methanol and the suspension cooled in a bath of solid carbon dioxide and ethanol to about −20°C.; 60 ml. concentrated hydrochloric acid were then added, with stirring, and the passing in of a gentle stream of chlorine commenced. The starting material dissolved within 15 to 30 minutes and after about 1 hour, the reaction mixture thickens like a gel. After passing in chlorine for 1 hour, the chlorine gas stream was stopped, the reaction mixture stirred for a further 30 minutes and an air stream then blown through the reaction mixture for 20 minutes. For neutralization, the reaction mixture was diluted with 50 ml. methanol and subsequently carefully adjusted to pH 5 with a methanolic ammonia solution (about 110 ml. of a 10M solution), the temperature during the shole operation being about −20°C. Water was thereupon added to the mixture to dissolve the precipitated ammonium chloride and thereafter desalinated over a charcoal column (50 × 3 cm.). Take off: 160,000 extinction units (256 nm). The charcoal eluate was fractionated by collecting a separate fraction until a pH of 7 was reached. This fraction was only slightly contaminated, whereas the alkaline eluate contained the main part of the by-products. Up to a pH value 7, 151,000 extinction units (256 nm) were obtained.

An aliquot containing 30,000 extinction units was passed over a Dowex 50-Na column and subsequently precipitated with acetone. Yield: 1.8 g. (64% of theory) 3-methylsulfonyl-6-hydroxypurine-ribofuranoside-3',5 -cyclophosphate.
Analysis of the free acid:
molecular weight: $C_{11}H_{13}N_4O_9PS \cdot H_2O = 426.2$
C calc. 31.0%; found 30.4%
H calc. 3.5%; found 3.5%
N calc. 13.1%; found 12.7%
P calc. 7.3%; found 7.1%

EXAMPLE 6

Preparation of
2-sulfoxymethyl-6-hydroxypurine-ribofuranoside-3',5'-cyclophosphate In a round-bottomed flask, 500 ml. (1.25mMol) pure 2-methylthio-6-hydroxypurine-ribofuranoside-3,5 -cyclophosphate sodium salt were dissolved in 25 ml. 0.2N aqueous sodium hydroxide solution adjusted with bromine to pH 7 and allowed to react for 5 minutes at ambient temperature. Excess bromine was subsequently stripped off in a vacuum; the acid solution was adjusted to pH 7 with 2N aqueous sodium hydroxide solution and further concentrated to about 2 ml. By dropping into ethanol/acetone (1:1), the 2-sulfoxymethyl derivative was precipitated as the sodium salt and purified a second time by analogous reprecipitation (removal of sodium bromide). Yield: 410 mg. (77% of theory) 2-sulfoxymethyl-6-hydroxypurine-ribofuranoside-3',5'-cyclophosphate.
Analysis of the crystallized free acid:
molecular weight: $C_{11}H_{13}N_4O_8PS \cdot H_2O = 410.2$
C calc. 32.2%; found 31.8%
H calc. 3.7%; found 3.6%
N calc. 13.6%; found 13.1%
P calc. 7.6%; found 7.6%

EXAMPLE 7

Preparation of
2-hexylamino-6-hydroxypurine-ribofuranoside-3',5'-cyclophosphate.

550 mg. of the mercapto compound obtained according to Example 5 were passed over a Dowex 50-H+ column (3 ml. content) and then washed with water. The eluate was evaporated to dryness, mixed with 3 ml. n-hexylamine and brought into solution by shaking; subsequently, it was heated under reflux for 2 hours. After cooling, the reaction mixture was taken up with 50 ml. water, 5 ml. DMSO added thereto to improve solution and the whole extracted twice with 30 ml. ether. The solution was concentrated in a rotary evaporator, passed over a Dowex 1×2 formate column (12 × 1 cm.) and washed with water. Pre-elution with formic acid up to 1.51 M removes the impurities and further elution with 3M formic acid elutes the desired product. In the case of repeated evaporation for the removal of the formic acid, the product began to precipitate out in crystalline form. After centrifuging off, it was washed through twice with a little ether and subsequently dried in a desiccator. Yield: 135 mg. 2-hexylamino-6-hydroxypurine-ribofuranoside-3',5'-cyclophosphate. Analysis of the crystallized, free acid:

molecular weight: $C_{16}H_{24}N_5O_7P \cdot H_2O = 447.4$

C calc. 42.9%; found 43.1%

H calc. 5.8%; found 5.8%

N calc. 15.6%; found 15.4%

P calc. 6.9%; found 6.6%

In analogous manner, with the use of dimethylamine instead of hexylamine, the corresponding 2-dimethylamino compound was obtained.

EXAMPLE 8

Preparation of 2-methyl-6-hydroxypurine-ribofuranoside-3',5'-cyclophosphate 480 mg. (1.5mMol) AICAR-3',5'-MP, free acid, were suspended in 6 ml. methanol and mixed with 1.5 mMol tetrabutyl ammonium hydroxide, the substance thereby going into solution. The solvent was evaporated off and the residue taken up in 6 ml. dry DMF and dehydrated three times with absolute methanol. To this solution were added 12 ml. orthoacetic acid triethyl ester and the reaction mixture heated under reflux for 2 to 4 hours. The clear reaction solution was subsequently evaporated to dryness in a high vacuum, the residue was dissolved in a little water, applied to 3 silica gel thick layer plates and developed with the mixture of isopropanol/ammonia/water (7:1:2). The desired product was contained in the strongest band, which was scratched off and eluted with water. After passage through charcoal for the removal of colloidally dissolved silica gel and subsequent freeze drying, 250 mg. pure 2-methyl-6-hydroxypurine-ribofuranoside-3',5'-cyclophosphate were obtained in the form of the sodium salt (corresponded to 45% yield of theory).

In analogous manner, with the use of orthohexylic acid and orthobenzoic acid triethyl ester, there were prepared the corresponding 2-hexyl and 2-phenyl compounds, respectively.

EXAMPLE 9

Preparation of 2-chloro-6-hydroxypurine-ribofuranoside-3',5'-cyclophosphate 2 g. G-3',5'-MP-Na (5.5mMol) were introduced, with stirring, into 12 ml. 30% hydrochloric acid cooled to 0°C. and a solution of 760 mg. sodium nitrite (11mMol) in 2 ml. water added thereto dropwise within the course of 3 hours., the reaction temperature being kept at 0°C. After completion of the addition, the reaction mixture was stirred for a further hour, then carefully adjusted to pH 4 with concentrated ammonia, while cooling, and the reaction solution passed over a column of charcoal (100 ml.). After washing, elution with ethanol/ammonia/water and evaporation of the eluate, approximately 5 ml. of concentrate were obtained and applied to 2 silica gel thick layer plates (40cm. 2 mm. $SiO_2$) and these developed twice with the system n-butanol/glacial acetic acid/water (50:15:25). Under ultra-violet light, 2 main bands were observed, the upper of which contained the desired 2-chlorocyclophosphate.

The upper band was lifted off, the silica gel extracted with water 5 or 6 times and the combined extracts again applied to a small charcoal column for the separation of colloidally dissolved silica gel. From the charcoal eluate, there were obtained, after passage through Dowex 50 and lyophilization, 650 mg. (30% of theory) of chromatographically pure 2-chloro-6-hydroxypurine-ribofuranoside-3',5'-cyclophosphate; molecular weight: 386.3.

EXAMPLE 10

Preparation of 2-Anilino-6-hydroxypurine-ribofuranoside-3',5'-cyclophosphate 30 mg. 2-chloro-6-hydroxypurine-ribofuranoside-3'5'-cyclophosphate sodium salt (0.8 mMol) are converted into the free acid on Dowex 50-H and the solution obtained of the free acid is evaporated to dryness and mixed with 2 ml. aniline in 5 ml. methanol. The clear solution is heated under reflux for 2 hours; paper chromatography with the mixture isopropanol/ammonia/water (7:1:2) thereafter shows quantitative reaction. The solvent is evaporated in a vacuum and the residue taken up with water and extracted twice with ether. Subsequent chromatography on Dowex 1×2 formate (column 10 × 1 cm.) with a water/3M formic acid gradient gives the 2-anilinocyclo-phosphate in the form of the crystallised free acid. Yield: 60 mg (18% of theory) 2-anilino-6-hydroxypurine-ribofuranoside-3',5'-cyclophosphate.

EXAMPLE 11

Preparation of 2-Morpholino-6-hydroxypurine-ribofuranoside-3',5'-cyclophosphate

Analogously to Example 10, 300 mg. 2-chloro-6-hydroxypurine-ribofuranoside-3',5-cyclophosphate sodium salt, after conversion into the free acid and reaction with 2 ml. morpholine in 5 ml. methanol at boiling temperature, are quantitatively converted, within 2 hours, into the corresponding 2-morpholino compound. Some xanthosine-3',5'-cyclophosphate is separated by chromatography on Whatman 3 MM paper with the mixture isopropanol/ammonia/water (7:1:2; running time 24 hours). The bands clearly running after this time above X-3',5'-MP are cut off and the nucleotide eluted with water, passed over Dowex 50-sodium and lyphilised. Yield: 200 mb. (61% of theory) 2-morpholino-6-hydroxypurine-ribofuranoside-3',5'-cyclophosphate.

EXAMPLE 12

Preparation of
2-n-Hexylthio-6-hydroxypurine-ribofuranoside-3',5'-cyclophosphate 2.5 g. crude 2-mercapto-6-hydroxypurine-ribofuranoside-3',5'-cyclophosphate (corresponding to about 4 mMol) were converted into the 2-hexythio derivative, analogously to Example 4, using n-hexyl bromide in a 0.2N aqueous sodium hydroxide solution-methanol mixture by shaking for 48 hours at ambient temperature. The isolation of the product by preparative silica gel thick layer chromatography and subsequent passage through charcoal gave 800 mg. (43% of theory) of the ammonium salt of 2-n-hexylthio-6-hydroxy-purine-ribofuranoside-3',5'-cyclophosphate.

EXAMPLE 13

Preparation of
2-(1-Phenylbutyl-(3)-amino)-6-hydroxyparine-ribofuranoside-3',5'-cyclophosphate 0.3 mMol 2-chloro-6-hydroxypurine-ribofuranoside (free acid) were treated in a bomb at 130°C. for 10 hours with 3 mMol (about 0.5 ml.) 1-phenyl-3-aminobutane in 5 methanol. After evaporation to about 3 ml. and preparative chromatography on Whatman 3MM paper, there were obtained 135 mg. (87% of theory) of the sodium salt of 2-(1-phenyl-butyl-(3)-amino)-6-hydroxypurine-ribofuranoside-3',5'- cyclophosphate.

EXAMPLE 14

Preparation of
2-Methylamino-6-hydroxypurine-ribofuranoside-3',5'-cyclophosphate 77 mg. (0.2 mMol) pure 2-chloro-6-hydroxpurine-ribofuranoside-3',5'-cyclophosphate sodium salt were converted with Dowex 50H form into the free acid and, after evaporation with the addition of 2 ml. methylamine solution (33% in ethanol), dissolved in 4 ml. methanol. Heating for 8 hours in a bomb at 80°C. gave a quantitative conversion. After purification by preparative paper chromatography, there are obtained 68 mg. (90% of theory) of the sodium salt of 2-methylamino-6-hydroxypurine-ribofuranoside-3',5'-cyclophosphate.

The following Table gives the ultra-violet spectra, electrophoretic mobilities and chromatographic data of the products of the above Examples:

| compound of general formula (I); X = | neutral 0.05 M PP | | acid 0.1 N HCl | | alkaline 0.1 N NaOH | |
|---|---|---|---|---|---|---|
| | max. | min. | max. | min. | max. | min. |
| 2-fluoro | 254 | 221.5 | 243.5 | 217.5 | 254 | 226 |
| 2-chloro | 255 | 225 | 251.5 | 222.5 | 256 | 231.5 |
| 2-mercapto | 280 | 240.5 | 292 230 | 248.5 222 | 281 | 251.5 |
| 2-methylthio | 261.5+ | 238.5 | 264 | 237 | 270 | 245 |
| 2-sulphoxy-methyl | 257++ | 234 | 254+++ 278.5 | 231 265 | 256.5++ | 229.5 |
| 2-methyl-sulphonyl | 256+++ 281.5 | 231.5 265.5 | 252.5+++ 283.5 | 232.5 263 | 256+++ 281 | 234 265.5 |
| 2-benzylamino | 255.5++ | 227 | 261+ | 236 | 261 | 238.5 |
| 2-benzoylamino | 258.5 289 238.5+ | 222 274.5 | 265.5 283 240+ | 222.5 273.5 | | |
| 2-cyclohexyl-amino | 255++ | 225.5 | 262+ | 234 | 260.5 | 237.5 |
| 2-morpholino | 260++ | 228 | 265.5 | 236.5 | 263.5 | 240.5 |
| 2-hexylamino | 255.5++ | 225.5 | 261.5+ | 233 | 260.5 | 237 |
| 2-piperidino | 262+ | 231 | 268 | 239.5 | 266 | 243 |
| 2-methyl | 248.5 | 224 | 250 | 223.5 | 255 | 229 |
| 2-diethylamino | 261+ | 230 | 267+ | 238 | 265 | 243 |
| 2-anilino | 274 | 241 | 274 | 245 | 282 | 254 |
| 2-n-hexylthio | 262++++ | 237.5 | 267 | 239 | 270.5 | 245.5 |
| 2-(1-phenyl-butyl-(3)-amino) | 255++++ | 227.5 | 261++++ | 234 | 260.5 | 238.5 |
| 2-methylamaino | 254++++ | 225.5 | 260++++ | 232 | 259.5 | 237 |
| 2-phenyl | 252 286 | 235 270 | 259 284 | 245 271 | 263.5++++ | 251.5 |

+shoulder in uv spectrum at 285 nm
++shoulder in uv spectrum at 275 nm
+5++shoulder in uv spectrum at 250 nm
++++shoulder in uv spectrum at 280/285 nm.

| compound of general formula (I); X = | UV quotients | | | | | | electro-phoretic mobility relative to A-3',5'-MP | chromato-graphy in solvent A |
|---|---|---|---|---|---|---|---|---|
| | neutral | | | acid | | | | |
| | 250/260 | 280/260 | 290/260 | 250/260 | 280/260 | 290/260 | | |
| 2-fluoro | 1.20 | 0.05 | 0.03 | 1.37 | 0.08 | 0.04 | 2 | 0.33 |
| 2-chloro | 0.92 | 0.29 | 0.07 | 1.29 | 0.47 | 0.21 | 1.95 | 0.29 |
| 2-mercapto | 0.75 | 1.76 | 1.68 | 0.66 | 2.11 | 2.67 | 2.18 | a 0.37 |
| 2-methylthio | 0.72 | 0.80 | 0.55 | 0.67 | 0.96 | 0.66 | 1.80 | 0.27 |
| 2-sulphoxy-methyl | 0.94 | 0.75 | 0.50 | 1.16 | 0.92 | 0.80 | 2.18 | 0.26 |
| 2-methyl-sulphonyl | 1.09 | 0.94 | 0.84 | 1.49 | 1.19 | 1.17 | 2.29 | 0.34 |
| 2-benzylamino | 0.97 | 0.68 | 0.53 | 0.72 | 0.63 | 0.51 | 0.92 | 0.55 |
| 2-benzoylamino | 0.89 | 0.84 | 0.93 | 0.83 | 1.02 | 0.97 | 1.18 | a 0.73 |

—Continued

| compound of general formula (I); X = | UV quotients | | | | | | electrophoretic mobility relative to A-3',5'-MP | chromatography in solvent A |
|---|---|---|---|---|---|---|---|---|
| | neutral | | | acid | | | | |
| | 250/260 | 280/260 | 290/260 | 250/260 | 280/260 | 290/260 | | |
| 2-cyclohexylamino | 0.98 | 0.62 | 0.49 | 0.70 | 0.56 | 0.48 | 0.83 | 0.71 |
| 2-morpholino | 0.77 | 0.61 | 0.52 | 0.58 | 0.78 | 0.54 | 1.46 | 0.25 |
| 2-hexylamino | 0.97 | 0.61 | 0.51 | 0.69 | 0.58 | 0.52 | 0.81 | 0.77 |
| 2-piperidino | 0.79 | 0.60 | 0.45 | 0.63 | 0.77 | 0.52 | 1.03 | 0.56 |
| 2-methyl | 1.38 | 0.29 | 0.07 | 1.18 | 0.20 | 0.04 | 1.18 | 0.34 |
| 2-diethylamino | 0.70 | 0.57 | 0.53 | 0.52 | 0.77 | 0.56 | 0.96 | 0.70 |
| 2-anilino | 0.58 | 1.30 | 1.14 | 0.65 | 1.44 | 1.23 | 1.00 | 0.32 |
| 2-phenyl | 0.99 | 0.93 | 0.98 | 0.95 | 0.99 | 0.98 | 1.09 | |
| 2-n-hexylthio | 0.68 | 0.89 | 0.71 | 0.62 | 1.11 | 0.86 | 1.4 | 0.62 |
| 2-(1-phenyl-butyl-(3)-amino) | 0.90 | 0.60 | 0.52 | 0.67 | 0.60 | 0.52 | 0.89 | 0.71 |
| 2-methylamino | 1.00 | 0.64 | 0.52 | 0.71 | 0.61 | 0.53 | 1.08 | 0.34 | a Leloir mixture: 1 M ammonium acetate/ethanol (20 50)
Solvent A: isopropanol/ammonia/water (7:1:2) descending 15 hours.

It will be understood that the specification and examples are illustrative but not limitative of the present invention and that other embodiments within the spirit and scope of the invention will suggest themselves to those skilled in the art.

What is claimed is:

1. Purine-ribofuranoside-3',5'-cyclophosphate compound of the formula

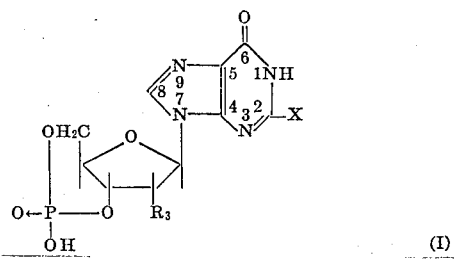

(I)

wherein X is:
i.

in which $R_1$ and $R_2$, which can be the same or different, are alkyl or cycloalkyl of up to 6 carbon atoms, aryl and aralkyl of up to 4 carbon atoms in the alkyl group and from 6 to 10 carbon atoms in the aryl moiety; or wherein $R_1$ and $R_2$, together with the nitrogen atom to which they are attached, form a 6-membered heterocyclic ring; or $R_2$ can be hydrogen;

ii. chlorine or fluorine;
iii. sulfhydryl or alkylthio of from 1 to 6 carbon atoms;
iv. alkyl of up to 6 carbon atoms;
v. alkylsulfonyl or alkylsulfoxy; or
vi. hydrocarbylthio where the hydrocarbyl moiety contains up to 12 carbon atoms and the physiologically compatible salts of said compound.

2. Compound as claimed in claim 1, wherein X is an amino group of the formula

in which $R_1$ and $R_2$ which may be the same or different, are cycloalkyl, aralkyl or aryl radicals of up to 12 carbon atoms, and $R_2$ can also be hydrogen, and wherein $R_1$ and $R_2$, together with the nitrogen atom to which they are attached, can form a heterocyclic ring of from 3 to 6 ring carbon atoms.

3. Compound as claimed in claim 1, wherein X is amino of the formula

in which $R_1$ and $R_2$, which can be the same or different, are alkyl or cycloalkyl of up to 6 carbon atoms, aryl and aralkyl of up to 4 carbon carbon atoms in the alkyl group and from 6 to 10 carbon atoms in the aryl moiety; or wherein $R_1$ and $R_2$, together with the nitrogen atom to which they are attached, form a 6-membered heterocyclic ring.

4. Compound as claimed in claim 1 wherein $R_2$ is hydrogen.

5. Compound as claimed in claim 1 wherein X is chlorine or fluorine.

6. Compound as claimed in claim 1 wherein X is sulfhydryl or alkylthio of from 1 to 6 atoms.

7. Compound as claimed in claim 1 wherein X is alkyl of up to 6 carbon atoms.

8. Compound as claimed in claim 1 wherein X is lower alkyl-sulfonyl or lower alkyl-sulfoxy.

9. Compound as claimed in claim 1 wherein said X is hydrocarbyl-S- wherein the hydrocarbyl is from 1 to about 12 carbon atoms.

10. Compound as claimed in claim 1 selected from the group consisting of
2-Fluoro-6-hydroxypurine-ribofuranoside-3',5'-cyclophosphate,
2-Benzylamino-6-hydroxypurine-ribofuranoside-3',5'-cyclophosphate,
2-Cyclohexylamino-6-hydroxypurine-ribofuranoside-3',5'-cyclophosphate,
2-Mercapto-6-hydroxypurine-ribofuranoside-3',5'-cyclophosphate,
2-Methylthio-6-hydroxypurine-ribofuranoside-3',5'-cyclophosphate,
2-Hexylthio-6-hydroxypurine-ribofuranoside-3',5'-cyclophosphate,
2-Methylsulphonyl-6-hydroxypurine-ribofuranoside-3',5'-cyclophosphate, 2-Methylsulphoxy-6-hydroxypurine-ribofuranoside-3',5'-cyclophosphate,
2-Hexylamino-6-hydroxypurine-ribofuranoside-3',5'-cyclophosphate,
2-Dimethylamino-6-hydroxypurine-ribofuranoside-3',5'-cyclophosphate,
2-Methyl-6-hydroxypurine-ribofuranoside-3',5'-cyclophosphate,
2-Chloro-6-hydroxypurine-ribofuranoside-3',5'-cyclophosphate,
2-Hexyl-6-hydroxypurine-ribofuranoside-3',5'-cyclophosphate,
2-Phenyl-6-hydroxypurine-ribofuranoside-3',5'-cyclophosphate,
2-Anilino-6-hydroxypurine-ribofuranoside-3',5'-cyclophosphate,
2-Morpholino-6-hydroxypurine-ribofuranoside-3',5'-cyclophosphate,
2-n-Hexylthio-6-hydroxypurine-ribofuranoside-3',5'-cyclophosphate,
2-(1-Phenylbutyl-(3)-amino)-6-hydroxypurine-ribofuranoside-3',5'-cyclophosphate,
2-Methylamino-6-hydroxypurine-ribofuranoside-3',5'-cyclophosphate.

11. Process of preparing a compound as claimed in claim 1 which comprises reacting a compound of the formula

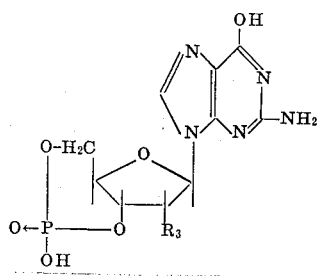

(wherein $R_3$ is defined as in claim 1) with a nitrite and haloboric acid at a temperature below 0°C to transform into the amino group to a halogen atom yielding a 2-halo compound as defined in claim 1.

12. Process as claimed in claim 11 wherein said 2-halo compound is converted to a 2-X' compound wherein X' is defined as X is defined in claim 1 other than halogen.

13. Process as claimed in claim 11 wherein the haloboric acid used is fluoboric acid.

14. Process as claimed in claim 11 wherein the reaction is carried out at a temperature of 0° to −40°C.

15. Process for the preparation of a compound as claimed in claim 8, which comprises
a. reacting a compound of the formula:

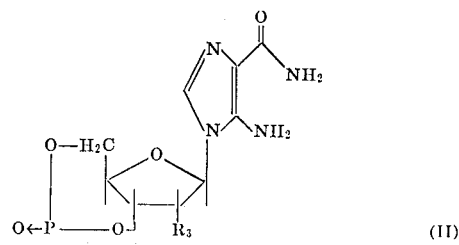

in which $R_3$ is defined as in claim 1, with an alkali metal xanthogenate in a polar organic solvent to give a sulfhydryl compound and
b. alkylating and oxidizing said compound to yield the desired alkylsulfoxy or sulfonyl compound.

16. Process for the preparation of a compound as claimed in claim 1, which comprises reacting a compound of the formula:

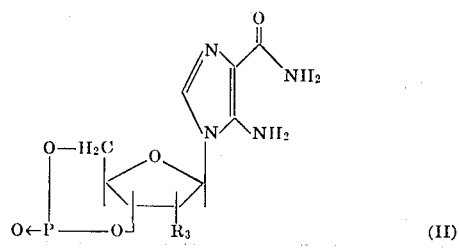

in which $R_3$ is defined as in claim 1, with an alkyl, aryl or aralkyl orthoformate to give a compound of the formula of claim 1 in which X is an alkyl, aryl or aralkyl radical.

17. Process as claimed in claim 15 wherein the desired compound is methylsulfonyl or methylsulfoxy.

18. Process as claimed in claim 15, wherein said alkylsulfonyl or alkylsulfoxy is converted into a substituted amino group.

19. Process as claimed in claim 15 wherein the starting material of the formula II is used in the form of a tetraalkyl-ammonium salt.

20. Process as claimed in claim 19 wherein the reaction is carried out in a lower aliphatic alcohol.

21. Process as claimed in claim 19 wherein the reaction is carried out at a temperature above 100°C. and under elevated pressure.

22. Process as claimed in claim 21, wherein the reaction is carried out in an autoclave at a temperature of 140° to 150°C.

23. Process as claimed in claim 15, wherein an alkylsulfhydryl radical present in the product is oxidized with chlorine gas in an acidic medium to an alkylsulfonyl radical.

24. Process as claimed in claim 15, wherein an alkylsulfhydryl radical present in the product is oxidized with periodate or hypobromite in an aqueous medium to an alkylsulfoxy radical.

* * * * *

UNITED STATES PATENT OFFICE
CERTIFICATE OF CORRECTION

Patent No. 3,872,082        Dated March 18, 1975

Inventor(s) Hans Ulrich Bergmeyer et al

It is certified that error appears in the above-identified patent and that said Letters Patent are hereby corrected as shown below:

Under the heading ABSTRACT delete the formula and substitute therefor the following formula:

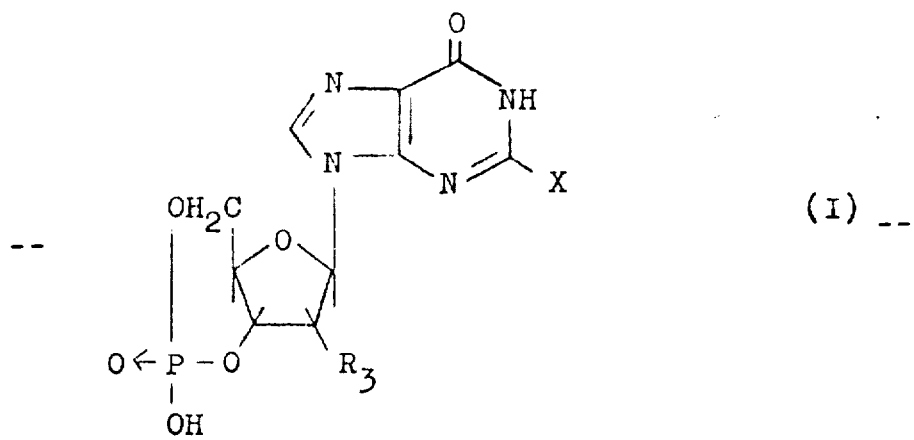

Column 1, lines 11 to 21, delete the formula and substitute therefor the following formula:

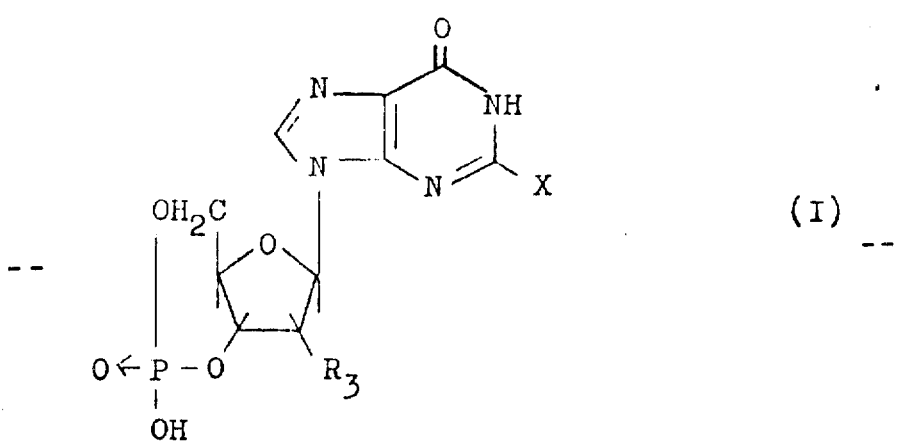

UNITED STATES PATENT OFFICE
CERTIFICATE OF CORRECTION

Page 2

Patent No. 3,872,082　　　　　Dated　March 18, 1975

Inventor(s)　Hans Ulrich Bergmeyer

It is certified that error appears in the above-identified patent and that said Letters Patent are hereby corrected as shown below:

Column 3, lines 6 to 16, delete the formula and substitute therefor the following formula:

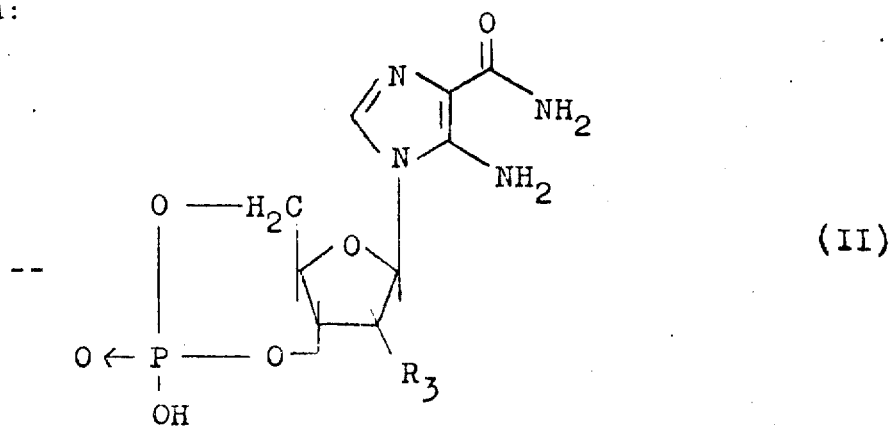

(II)

Column 18, lines 20 to 28, delete the formula and substitute therefor the following formula:

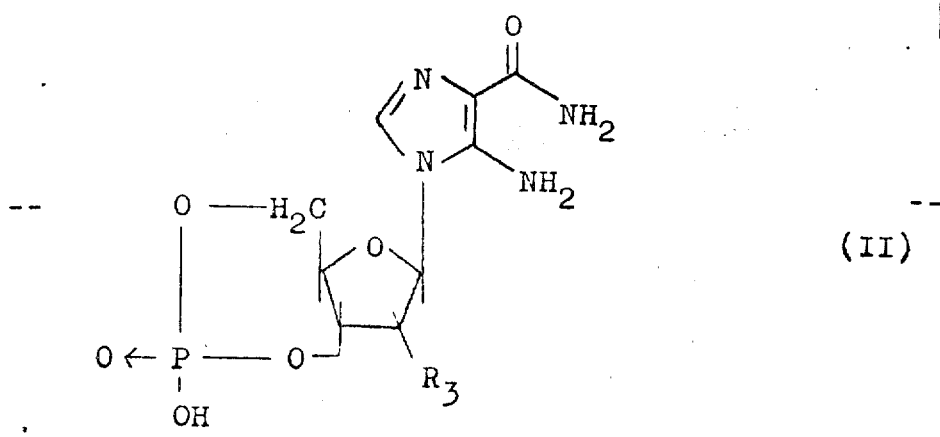

(II)

UNITED STATES PATENT OFFICE
CERTIFICATE OF CORRECTION

Patent No. 3,872,082          Dated March 18, 1975

Inventor(s) Hans Ulrich Bergmeyer et al

It is certified that error appears in the above-identified patent and that said Letters Patent are hereby corrected as shown below:

Column 4, line 66, delete                                "isopropylene"

and substitute therefor        --isopropylidene--.

Column 6, line 7, delete                                "thet"

and substitute therefor        --the--.

Column 13, line 20, delete                                "hydroxyparine"

and substitute therefor        --hydroxypurine--.

Column 14, line 1, delete                                "5"

and substitute therefor        --5 ml.--.

Column 13 - Table - under Compound heading,

18th compound listing delete     "2-methylamaino"

and substitute therefor        --2-methylamino--.

UNITED STATES PATENT OFFICE
CERTIFICATE OF CORRECTION

Patent No. 3,872,082          Dated March 18, 1975

Inventor(s) Hans Ulrich Bergmeyer et al

It is certified that error appears in the above-identified patent and that said Letters Patent are hereby corrected as shown below:

Column 13 - Table - section regarding shoulder in uv spectrum, the third line of this section delete     "+5++shoulder in uv spectrum at 250 nm"

and substitute therefor     --+++ shoulder in uv spectrum at 250 nm--.

Signed and Sealed this twenty-second Day of July 1975

[SEAL]

Attest:

RUTH C. MASON  
Attesting Officer

C. MARSHALL DANN  
Commissioner of Patents and Trademarks